United States Patent [19]
Olsen

[11] Patent Number: 4,749,073
[45] Date of Patent: Jun. 7, 1988

[54] SOFT-START ELECTROMAGNETIC COUPLING

[75] Inventor: Robert A. Olsen, Janesville, Wis.

[73] Assignee: Dana Corporation, Toledo, Ohio

[21] Appl. No.: 48,672

[22] Filed: May 11, 1987

[51] Int. Cl.$^4$ .................... F16D 27/10; F16D 27/14
[52] U.S. Cl. .................... 192/52; 192/84 R; 192/84 C
[58] Field of Search ............... 192/84 R, 84 A, 84 B, 192/84 C, 40, 52; 188/161; 335/279, 281

[56] References Cited

U.S. PATENT DOCUMENTS

| | | | |
|---|---|---|---|
| 3,019,876 | 2/1962 | Rabinow | 192/84 A |
| 4,160,498 | 7/1979 | Newton et al. | 192/84 C |
| 4,471,860 | 9/1984 | Yamada | 192/52 |
| 4,509,091 | 4/1985 | Booth | 361/154 |
| 4,567,975 | 2/1986 | Roll | 192/84 C |
| 4,635,774 | 1/1987 | Sekiguchi et al. | 192/52 |
| 4,685,202 | 8/1987 | Booth et al. | 188/161 X |

Primary Examiner—Rodney H. Bonck
Attorney, Agent, or Firm—Leydig, Voit & Mayer, Ltd.

[57] ABSTRACT

The rotor and armature of an electromagnetic clutch are formed with multiple regions of high magnetic reluctance defined by slots which are shaped and located such that the radial relation between the slots of the rotor and the slots of the armature changes as one member rotates relative to the other. As a result, the flux density across the air gap between the rotor and the armature varies when the armature slips relative to the rotor during initial engagement of the two. This lowers the average torque transmitted by the rotor to the armature and allows the clutch to engage gradually or with a soft-start before building up to full torque.

23 Claims, 8 Drawing Sheets

SOFT-START ELECTROMAGNETIC COUPLING

BACKGROUND OF THE INVENTION

This invention relates generally to an electromagnetic coupling and, more particularly, to an electromagnetic clutch which may be of the same general type as disclosed in Newton et al U.S. Pat. No. 4,160,498.

In a clutch of this type, a disc-like driving member such as a rotor is disposed in opposing face-to-face relation with a disc-like driven member such as an armature. Both members are made of low reluctance magnetic material (e.g., steel) and are supported to rotate about a common axis. Normally, the driving member is spaced axially from and rotates relative to the driven member. When a multiple turn winding is energized by current supplied from a voltage source, magnetic flux threads across the air gap between the two members and attracts the members axially into engagement. The magnetic flux also couples the members rotatably so as to cause the driving member to transmit torque to the driven member.

It is conventional to form the driving and driven members with multiple poles which cause the magnetic flux to zig-zag back and forth several times across the air gap between the two members. The multiple poles usually are formed by providing at least one high magnetic reluctance region in one of the members and at least two high magnetic reluctance regions in the opposing member. Usually, the two high reluctance regions of the one member are spaced radially from opposite sides of the high reluctance region in the opposing member and, as a result, the flux is forced to thread a zig-zag path across the air gap between the two members. The high reluctance regions may be provided either by slotting or grooving the members to form one or more circumferentially extending air gaps therein or by placing circumferentially extending bands of non-magnetic material (e.g., copper) in the members. The magnetic poles of each member are located on radially opposite sides of the high reluctance region or regions thereof.

In some applications, it is desirable for the clutch to engage gradually or in a "soft-start" mode rather than becoming fully and abruptly engaged in a matter of milliseconds. Roll U.S. Pat. No. 4,567,975 discloses a clutch with soft-start capability but that clutch requires a special electronic control for reducing the magnitude of the current flowing through the winding during start-up and for then gradually increasing the current to achieve full torque. When the current is at lower magnitudes, the driven member slips relative to the driving member to enable the clutch to reach full engagement gradually rather than abruptly.

SUMMARY OF THE INVENTION

The general aim of the present invention is to provide a new and improved electromagnetic coupling in which opposing disc-like members (e.g., the driving and driven members) are uniquely constructed in such a manner as to enable the members to engage gradually and then to reach high torque without need of a specialized electrical control for regulating the degree of engagement of the members.

A more detailed object of the invention is to achieve the foregoing by providing disc-like members in which the opposing high reluctance regions are arranged to move from less nearly radially matched positions to more nearly radially matched positions and then back to less nearly radially matched positions as the relative angular positions of the members change through 360 degrees. As a result of the changing radial relationship between the high reluctance regions of the two members, the strength of the flux field varies during start-up so as to reduce the average torque which is initially transmitted between the members and thereby enable the members to engage gradually.

Still another object of the invention is to provide an electromagnetic coupling in which the high reluctance regions are shaped and located so as to permit high torque to be transmitted between the disc-like members once the members have engaged gradually.

The invention also resides in varying the specific shape and location of the high reluctance regions in accordance with the type of load associated with the coupling.

These and other objects and advantages of the invention will become more apparent from the following detailed description when taken in conjunction with the accompanying drawings.

BRIEF DESCRIPTION OF THE DRAWINGS

FIGS. 19, 20 and 21 are views similar to FIGS. 3, 4 and 5, respectively, but illustrate still another version of disc-like members constructed in accordance with the invention; FIG. 19 showing the relative positions of the members when transmitting maximum torque.

DETAILED DESCRIPTION OF THE PREFERRED EMBODIMENTS

As shown in the drawings, the invention is embodied in an electromagnetic coupling 25 which could be a brake but which, in this specific instance, is shown as being an electromagnetic clutch. Simply for convenience of illustration, the clutch 25 has been shown as being used in conjunction with an automobile air conditioning compressor 26 having a tubular nose 27 for mounting the clutch and having a drive shaft 28 which extends through the nose.

The clutch 25 includes an electromagnet which is formed in part by a fixed annular magnet core 30 of substantially J-shaped radial cross-section and having an inner pole ring 31 and an outer pole ring 32. Formed integrally with and extending radially between the rear ends of the pole rings is a bridge 33 which is fastened rigidly to the front end of the compressor 26. A multiple turn winding 34 is secured within a U-shaped channel 35 which, in turn, is fastened to the outer side of the inner pole ring 31.

A rotary member in the form of an annular rotor 40 is rotatably journaled on the nose 27 of the compressor 26 by a bearing 41 and is adapted to be driven from the engine of the vehicle by an endless belt 42. The rotor is substantially U-shaped in radial cross-section and includes inner and outer concentric annular pole pieces 43 and 44, the inner pole piece being secured to the outer race of the bearing 41. The inner pole piece 43 of the rotor 40 is spaced inwardly from the inner pole ring 31 of the magnet core 30 while the outer pole piece 44 of the rotor is located between and is spaced from the winding 34 and the outer pole ring 32 of the core. Several axially spaced grooves extend circumferentially around the outer side of the outer pole piece 44 and interfit with complemental ribs on the inner side of the drive belt 42. Accordingly, the outer pole piece 44 defines a pulley for the belt.

Formed integrally with the forward end of the inner pole piece 43 of the rotor 40 and extending radially toward the outer pole piece 44 thereof is an annular and circular disc-like member 50 (FIG. 2) which defines the forward working face of the rotor. The outer periphery of the rotor disc 50 is rigidly joined to the outer pole piece 44 of the rotor.

Figure 1:
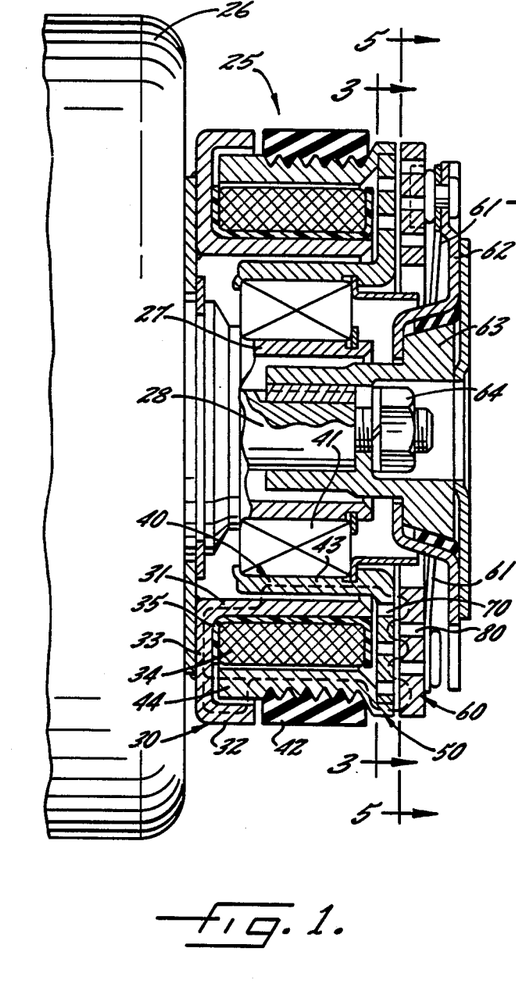
FIG. 1 is a diametrical sectional view of a new and improved electromagnetic coupling incorporating the unique features of the present invention.

Located in face-to-face opposing relation with the rotor disc 50 is another annular and circular disc-like rotary member 60 which constitutes the armature of the clutch 25. Three leaf springs 61 (FIG. 1) are spaced angularly around and extend generally chordwise of the armature 60. One end of each spring is connected to the armature while the other end of each spring is coupled to an annular bumper plate 62. The bumper plate 62 is supported to rotate with a hub 63 which, in turn, is keyed rigidly to the compressor shaft 28, the hub being held in an axially fixed position on the shaft by a nut 64.

The springs 61 couple the armature 60 for rotation in unison with the bumper plate 62 and the hub 63 and urge the armature away from the forward disc 50 of the rotor 40. When the winding 34 is not excited, a very narrow axial air gap 65 (FIG. 2) exists between the rotor disc 50 and the armature disc 60 so as to leave the rotor disc free to turn relative to the armature disc. Accordingly, the clutch 25 is disengaged and thus the belt 42 may turn the rotor 40 without torque being transmitted to the armature 60 and the compressor shaft 28.

The magnet core 30, the rotor 40 and the armature 60 are all made of a material such as steel of a type having a low magnetic reluctance. When the winding 34 is excited by current from a voltage source, magnetic flux is produced and threads along a path extending through the core 30, the rotor 40 and the armature 60. The flux path is indicated schematically by the dashed line shown in FIG. 2. In general, the flux threads a circuit extending from the inner pole ring 31 of the magnet core 30 to the inner pole piece 43 of the rotor 40, across the air gap 65 to the armature 60, ultimately back across the air gap to the outer pole piece 44 of the rotor 40, to the outer pole ring 32 and the bridge 33 of the magnet core 30 and thence back to the inner pole ring 31 of the magnet core. As a result of traversing such a path, the flux magnetically attracts the armature disc 60 axially into engagement with the rotor disc 50 and couples the two rotatably together so as to cause the rotor disc to transmit torque to the armature disc and thereby drive the compressor shaft 28. A somewhat more detailed description of the general flux path is set forth in the aforementioned Newton et al patent to which reference is made.

As described thus far, the clutch 25 is of conventional construction. In such a clutch, it also is conventional to form the rotor and armature discs 50 and 60 with regions of high magnetic reluctance (to be explained in detail subsequently) in order to force the flux to zig-zag back and forth several times across the air gap 65 between the two discs. This makes the clutch of multiple magnetic pole construction.

In accordance with the present invention, the high magnetic reluctance regions of the opposing rotor and armature discs 50 and 60 are uniquely shaped and located so as to cause the opposing high reluctance regions to move from less nearly radially alined positions to more nearly radially alined positions and then back to less nearly radially alined positions as one disc rotates relative to the other. As a result, the effective strength of the flux field across the air gap 65 first decreases and then increases during relative rotation between the discs through 360 degrees or less. The varying flux field reduces the average torque transmitted from the driving member (i.e., the rotor disc 50) to the driven member (i.e., the armature disc 60) during initial engagement and results in gradual initial engagement or a "soft-start".

Figures 3, 4, 5:
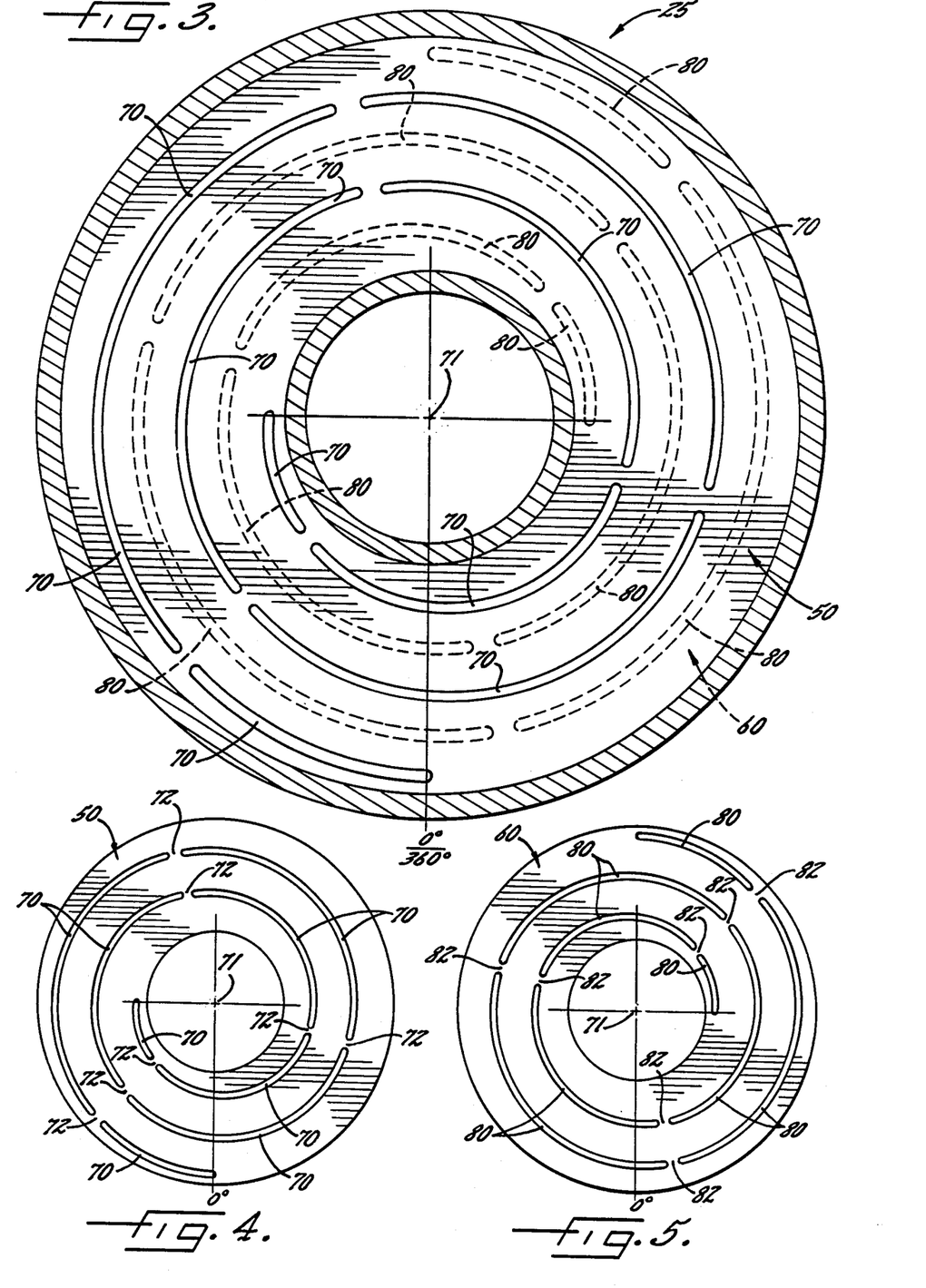
FIG. 3 is an enlarged cross-section taken substantially along the line 3—3 of FIG. 1, the view being partially schematic.
FIG. 4 is a rear elevational and partially schematic view, on a reduced scale, of one of the disc-like members shown in FIG. 1.
FIG. 5 is a rear elevational and partially schematic view, on a reduced scale, of the other disc-like member, the view being taken substantially along the line 5—5 of FIG. 1.

More specifically, the high reluctance regions in the rotor disc 50 are indicated by the reference numeral 70 in FIG. 4. Such regions could be formed by slotting or grooving the disc 50 and filling the slots or grooves with a material such as copper or aluminum having high magnetic reluctance. In the present instance, however, the high magnetic reluctance regions 70 are formed simply by cutting eight "banana" slots completely through the disc 50 and leaving the slots unfilled. The air between the edges of the slots 70 forms a high reluctance barrier. The slots may be cut by a laser in somewhat the same manner disclosed in commonly assigned Booth et al U. S. Application Ser. No. 818,217, filed Jan. 13, 1986 and now U.S. Pat. No. 4,685,202.

While the slots 70 or other high reluctance regions of the rotor disc 50 can be variously shaped and located, one specific shape and location is shown in FIG. 4. As illustrated, the overall arrangement of the slots 70 corresponds in shape to a multi-turn spiral having its center at the central axis 71 of the disc 50, that axis coinciding with the axis of the compressor shaft 28. In their entirety, the present slots 70 define a spiral which makes 2-¼ turns about the axis 71. While a continuous spiral-shaped slot could be formed through the disc 50, the slots 70 herein are discontinuous and are separated angularly from one another by angularly spaced webs 72 (FIG. 4) of low magnetic reluctance. The webs 72 are an integral part of the low reluctance disc 50 itself and result simply because the slots 70 are not continuous but instead are spaced angularly from one another. Herein, there are three groups of webs 72 spaced angularly from one another by 120 degrees with the webs of each particular group being in radial alinement with one another. The webs 72 cause the rotor disc 50 to have higher mechanical strength than otherwise would be the case of a continuous multiple turn spiral slot were formed in the disc.

In the embodiment of the clutch 25 shown in FIGS. 1 to 14, the armature disc 60 is formed with high reluctance regions which are precisely identical in size, shape and location to the high reluctance regions 70 of the rotor disc 50. In FIG. 5 and other views, the slots forming the high reluctance regions of the armature disc 60 have been designated by the reference numeral 80 while the intervening low reluctance webs of the armature have been indicated by the reference numeral 82.

In order to gain an understanding of the operation of the clutch 25, assume that the rotor disc 50 initially is positioned as shown in FIG. 4 and that the armature disc 60 initially is positioned as shown in FIG. 5. When the discs are so positioned, the "spiral" defined by the rotor slots 70 is 180 degrees out of phase with the "spiral" defined by the armature slots 80. Stated differently and as shown in FIGS. 4 and 5, the outer turn of the rotor spiral starts at a six o'clock position while the outer turn of the armature spiral starts at a twelve o'clock position. FIG. 3 shows the relative position of the various slots as viewed from the back of the rotor disc 50 when the two "spirals" are 180 degrees out of phase.

Figure 2:
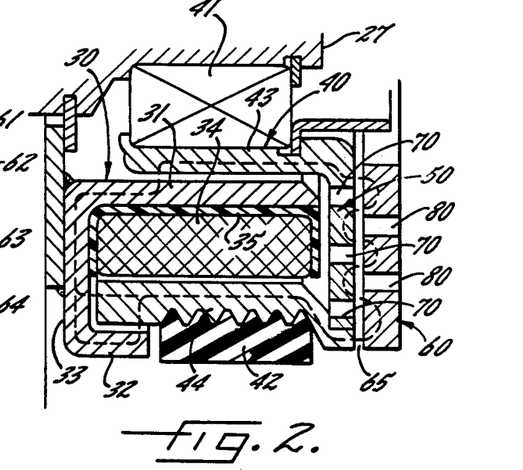
FIG. 2 is an enlarged view of certain parts shown in FIG. 1.

When the discs 50 and 60 are so positioned, the slots 70 in the rotor disc are spaced radially from the slots 80 in the armature disc by maximum and substantially equal distances as shown in FIGS. 2 and 3 and thus there is a maximum radial mismatch between the slots 70 and the slots 80. Under these circumstances, the flux threading out of the inner pole piece 43 of the rotor 40 crosses from the rotor disc 50 and axially across the narrow air gap 65 to the armature disc 60. The high reluctance barriers established by the slots 70 and 80 in the discs 50 and 60 prevent the flux from threading radially through the slots and thus the flux is forced to zig-zag back and forth across the air gap 65 and between the rotor disc and the armature disc until the flux reaches the outer pole pieces 44 of the rotor 40 (see the dashed line flux path in FIG. 2). Since, in particular instances, the radial spacing between adjacent slots 70 and 80 is substantially equal, the flux passes through low reluctance annular magnetic poles of substantially equal radial width each time the flux threads radially before crossing axially across the air gap. This results in a substantially constant flux density at the interface between the rotor and armature discs 50 and 60 and causes the rotor disc to transmit maximum torque to the armature disc.

Figures 6, 7, 8:
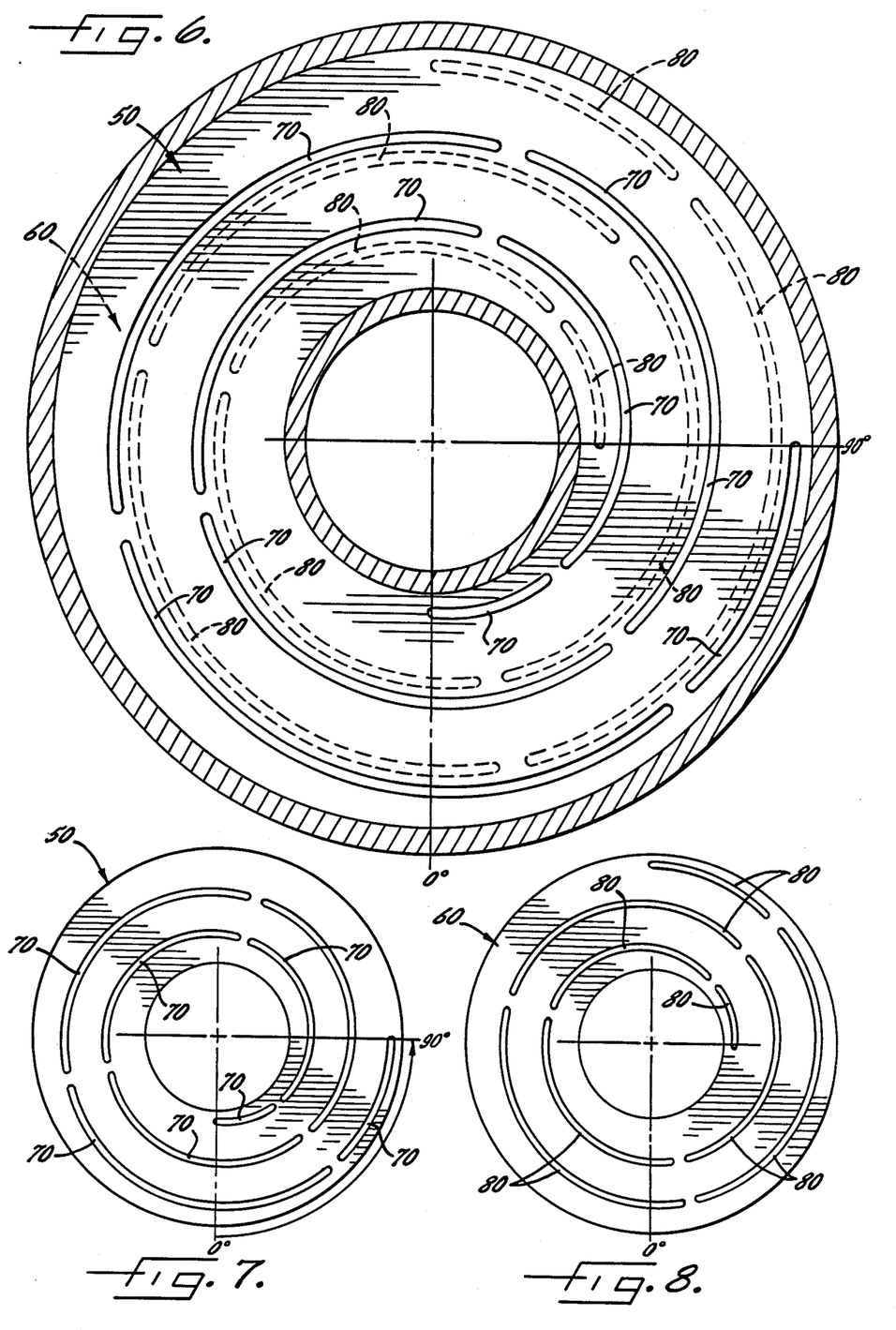
FIGS. 6, 7 and 8 are views similar to FIGS. 3, 4 and 5, respectively, but show the relative positions of the two members after one of the members has been rotated through 90 degrees with respect to the other member.

Now assume that the rotor disc 50 turns 90 degrees in a counterclockwise direction relative to the armature disc 60 from the position shown in FIG. 4 to the position shown in FIG. 7. Assume further for purposes of explanation that the armature disc 60 does not change positions (compare FIGS. 5 and 8). With the rotor disc 50 having turned counterclockwise through 90 degrees relative to the armature disc 60, the relative position of the slots 70 and 80, when viewed from the back of the rotor disc, is as illustrated in FIG. 6. By comparing FIG. 6 with FIG. 3, it will be apparent that, by virtue of the spiral arrangements of the rotor and armature slots 70 and 80, the uniformity of the radial spacing between the rotor slots and the armature slots has decreased significantly and that the degree of radial mismatch between the two sets of slots is significantly less than was the case when the rotor disc 50 was positioned relative to the armature disc 60 in the manner shown in FIG. 3. Also, the low reluctance magnetic poles between adjacent slots no longer are of substantially equal radial width but instead there are relatively wide poles and relatively narrow poles. The flux still is forced to zig-zag back and forth between the rotor disc 50 and the armature disc 60 but, because of the varying radial width of the different poles, the flux field no longer is of substantially uniform density. Thus, the flux saturates the narrow poles while the flux density in the wide poles is relatively low. As a result, progressively less torque is transmitted as the rotor disc 50 rotates progressively relative to the armature disc 60 in a direction to cause the radial mismatch between the slots 70 and 80 to become progressively less.

Figure 2A:
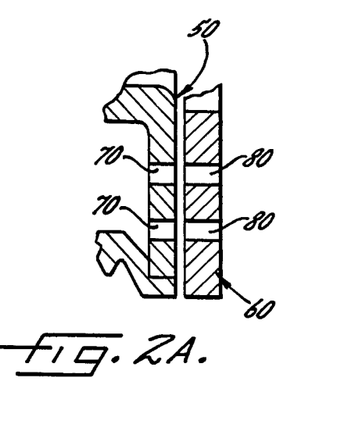
FIG. 2A is a view similar to FIG. 2 but shows one of the disc-like members of the coupling in a moved position relative to the other member.
Figures 9, 10, 11:
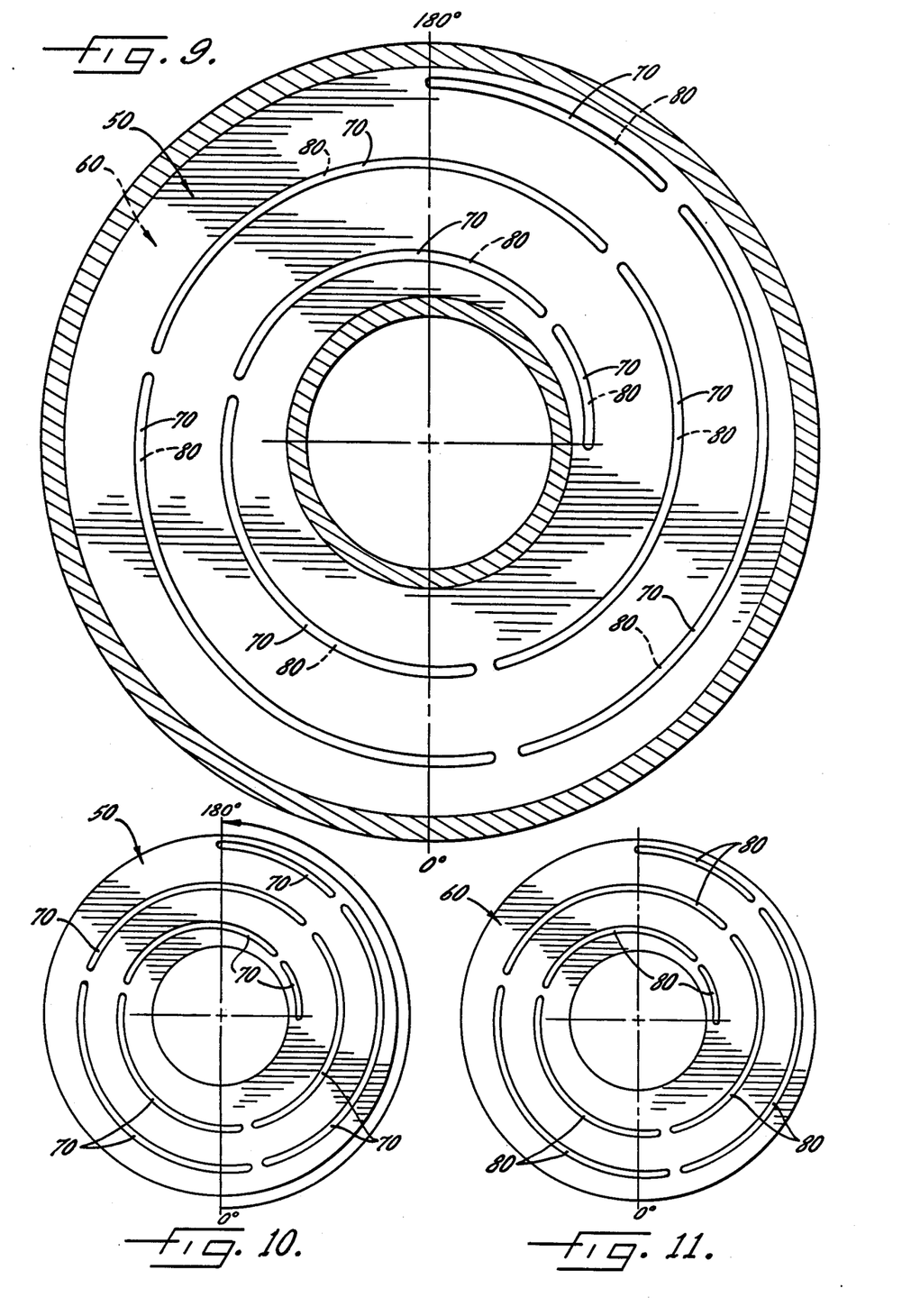
FIGS. 9, 10 and 11 also are views similar to FIGS. 3, 4 and 5, respectively, but show the relative positions of the two members after the one member has been rotated through 180 degrees with respect to the other member.

FIG. 10 shows the rotor disc 50 as having rotated 180 degrees relative to the armature disc 60 which, in FIG. 11, is shown in the same position as in FIGS. 5 and 8. FIG. 9 shows the positions of the rotor slots 70 and the armature slots 80 after the rotor disc has rotated through 180 degrees relative to the armature disc. As is apparent, the two "spirals" now are in phase and thus the slots 70 of the rotor disc 50 are precisely matched or alined both radially and circumferentially with the slots 80 of the armature disc 60. The radial match is shown in FIG. 9 and also is shown in FIG. 2A. Referring to FIG. 2A, it will be seen that the flux path is broken or interrupted because the flux cannot cross the high reluctance barriers presented by the directly opposing slots 70 and 80 and thus cannot zig-zag back and forth across the air gap 65. Under such conditions, zero torque or substantially zero torque is transmitted from the rotor disc 50 to the armature disc 60.

Figures 12, 13, 14:
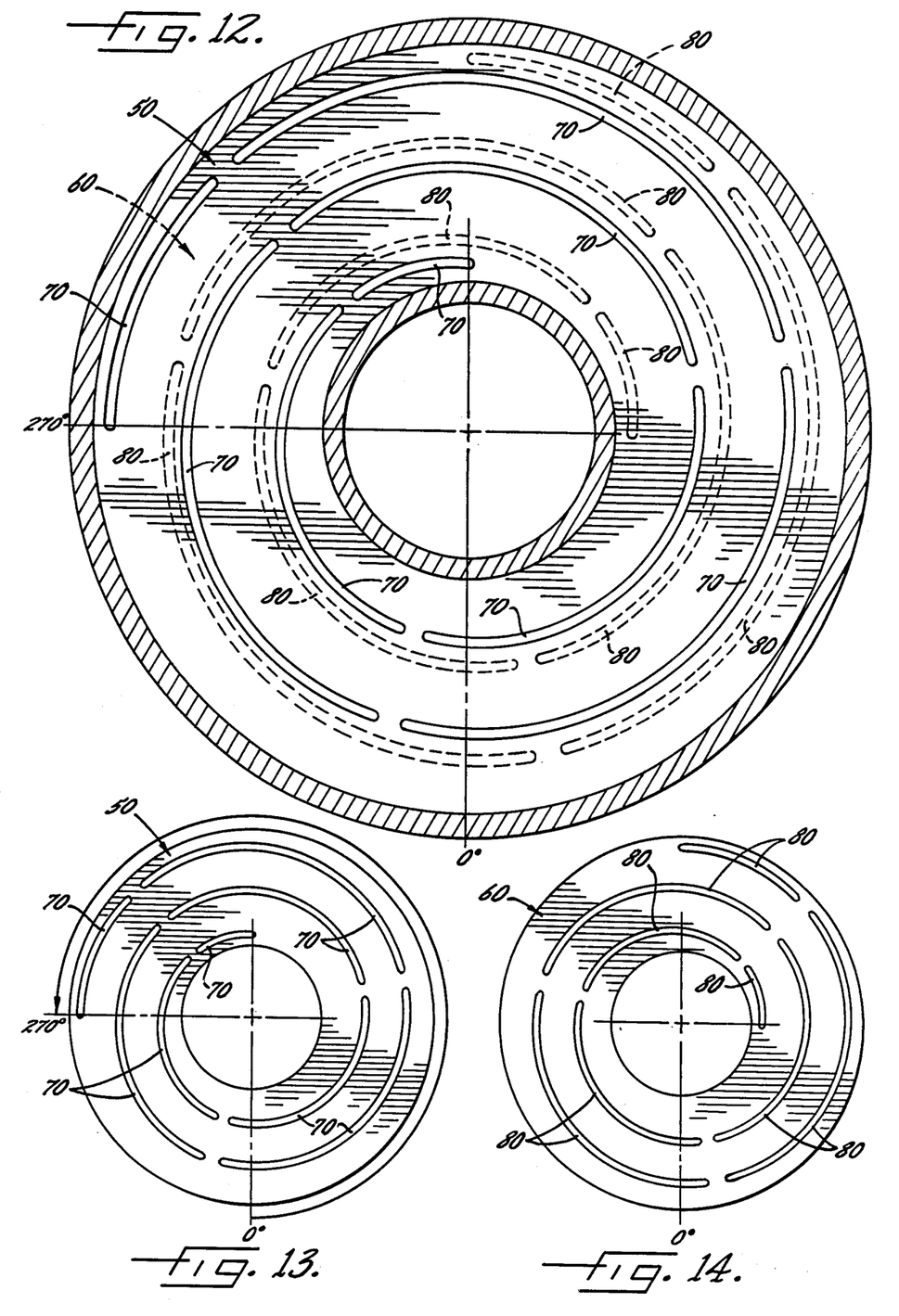
FIGS. 12, 13 and 14 are additional views which are similar to FIGS. 3, 4 and 5, respectively, but show the relative positions of the two members after the one member has been rotated through 270 degrees with respect to the other member.

FIG. 13 shows the position of the rotor disc 50 after the latter has rotated a total of 270 degrees relative to the armature disc 60 or 90 degrees from the zero torque position shown in FIG. 9. FIG. 14 shows the armature disc 60 in the same stationary position as FIGS. 5, 8 and 11 while FIG. 12 shows the relative location of the slots 70 and 80, as seen from the back of the rotor disc 50, after the rotor disc has rotated through 270 degrees relative to the armature disc. As is apparent, the rotor slots 70 have moved out of matched radial alinement with the armature slots 80 so that magnetic poles of varying radial width once again exist between the slots to allow the flux to zig-zag back and forth across the air gap 65. As the rotor disc 50 turns progressively from the matched position shown in FIG. 9 to the position shown in FIG. 12, the rotor slots 70 progressively move more nearly out of radial alinement with the armature slots 80 and thus the rotor disc 50 transmits progressively higher torque to the armature disc 60. The torque increases progressively to even higher values as the rotor disc 50 turns progressively relative to the armature disc 60 from the position shown in FIG. 12 back to the position shown in FIG. 3. When the rotor disc reaches the latter position, the radial mismatch between the slots 70 and 80 once again reaches a maximum and thus maximum torque is transmitted at least instantaneously until the rotor again proceeds toward the position in FIGS. 6 and 7.

When the armature disc 60 is first attracted axially into engagement with the rotor disc 50, there is slippage between the two. Because of the arrangement of the slots 70 and 80 as described above, the torque transmitted from the rotor disc to the armature disc varies from a maximum value to zero (or substantially zero) and then back to a maximum value during each revolution of slip between the rotor disc and the armature disc. As a result, the average torque transmitted from the rotor disc to the armature disc during the period of slippage is lower than that of a conventional clutch. This causes the load driven by the armature disc to be brought up to rotational speed over a longer period of time than is the case with a conventional clutch and thus the clutch engages gradually or with soft-start capability rather than fully engaging abruptly or in a matter of milliseconds as is the case with a conventional clutch. Accordingly, the likelihood of belt squeal, belt damage or breakage, engine slow down and shaft damage is significantly reduced. And, this is achieved without the need of a specialized electronic control for varying the magnitude of the current flowing through the winding 34.

Once the rotor disc 50 and the armature disc 60 have been brought into full engagement and the slippage has been terminated, the two discs assume such fixed relative angular positions as is necessary to transmit the torque required by the compressor shaft 28. If the load demands the full torque capacity of the clutch 25, the discs will lock relative to one another in the maximum torque position shown in FIG. 3 and will transmit full torque to the shaft. If less than the full torque capacity of the clutch is required, the two discs may, after slippage has stopped, lock into relative angular positions somewhere between the maximum torque condition shown in FIG. 3 and the zero torque condition shown in FIG. 9. Thus, even though the average torque transmitted by the clutch is relatively low during start-up, the clutch is capable of transmitting high torque once full engagement has occurred. With the particular clutch shown in FIGS. 1 to 14, the full torque capacity after full engagement is approximately twice the average torque transmitted for each revolution during start-up.

Figure 15:
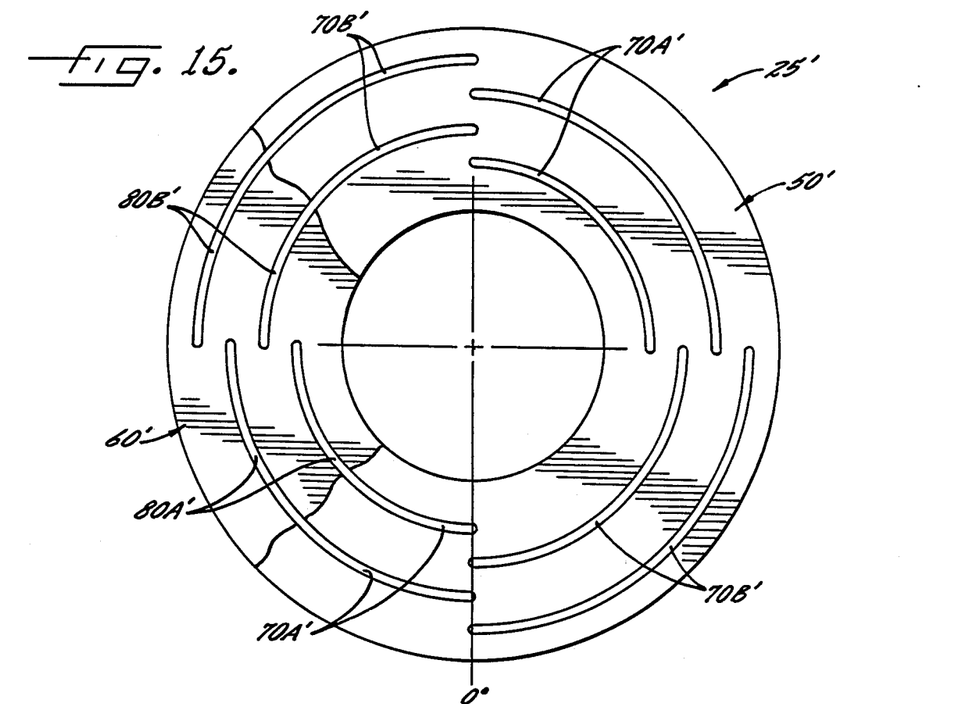
FIGS. 15 to 18 are views generally similar to FIG. 3 but show another version of disc-like members constructed in accordance with the invention, the members being illustrated in different relative angular positions in the different views.
Figure 16:
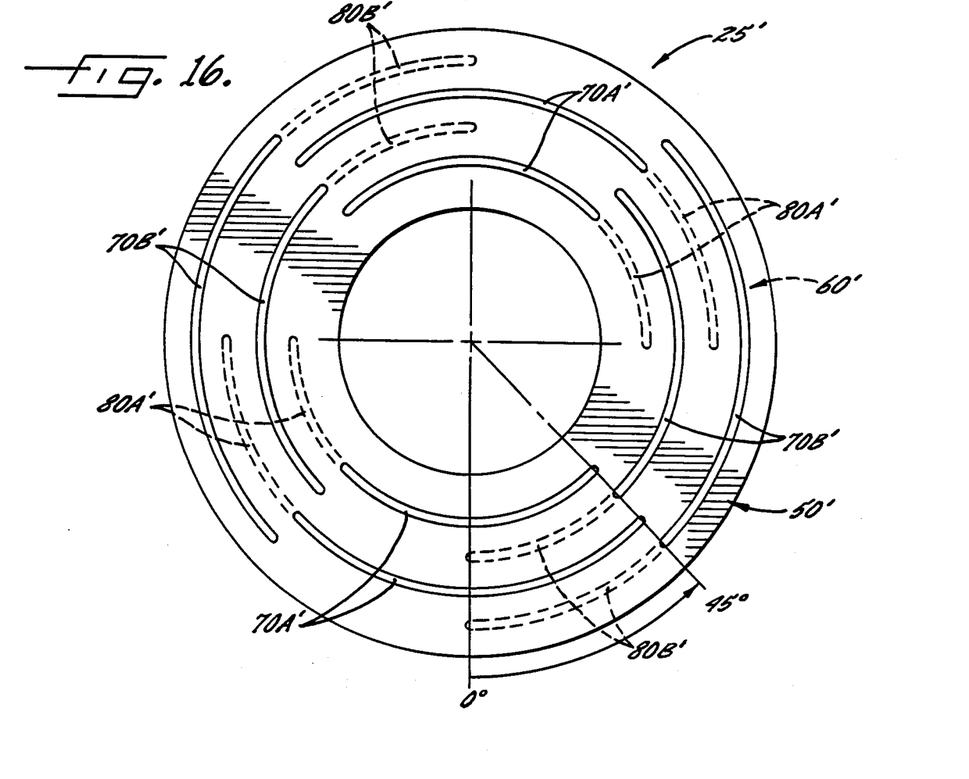

FIGS. 15 to 18 show a clutch 25' having a rotor disc 50' and an armature disc 60' with slots 70' and 80', respectively, which are arranged differently from the slots 70 and 80 of the clutch 25 and which may be formed without need of generating a spiral configuration. As shown in FIG. 16, the rotor disc 60' is formed with one pair of radially spaced slots 70A' and with a second pair of radially spaced slots 70A' alined radially with and spaced diametrically from the first pair. Each of the slots 70A' extends through a true arc of 90 degrees.

The rotor disc 60' also includes two diametrically spaced pairs of arcuate slots 70B' which are located circumferentially between the slots 70A'. Each of the slots 70B' also extends through an arc of 90 degrees. The two slots 70B' of the two pair are alined radially with one another but are offset radially from the slots 70A'.

The armature disc 60' (FIG. 15) is identical to the rotor disc 50' and its corresponding slots have been designated as 80A' and 80B'.

FIG. 15 shows the positions of the rotor slots 70A' and 70B' relative to the armature slots 80A' and 80B' when the rotor and armature discs 50' and 60' are located angularly relative to one another to produce zero torque. When the discs are so positioned, the slots 70A' and 70B' of the rotor 50' are disposed in radial alinement with the slots 80A' and 80B', respectively, of the armature 60'. Because of such alinement, virtually no flux is transmitted between the rotor and the armature and thus substantially no torque is transmitted.

FIG. 16 shows the relative positions of the discs 50' and 60' after the rotor disc has been rotated through 45 degrees relative to the armature disc. As shown, portions of the rotor slots 70A' are radially matched with portions of the armature slots 80A' while other portions of the rotor slots 70A' are radially mismatched with portions of the armature slots 80B'. In addition, portions of the rotor slots 70B' are radially matched with certain portions of the armature slots 80B' while other portions of the rotor slots 70B' are radially mismatched with portions of the armature slots 80A'. As a result of the partial radial mismatch between the various slot portions, some torque (i.e., approximately 50 percent torque) is transmitted from the rotor 50' to the armature 60'.

Figure 17:
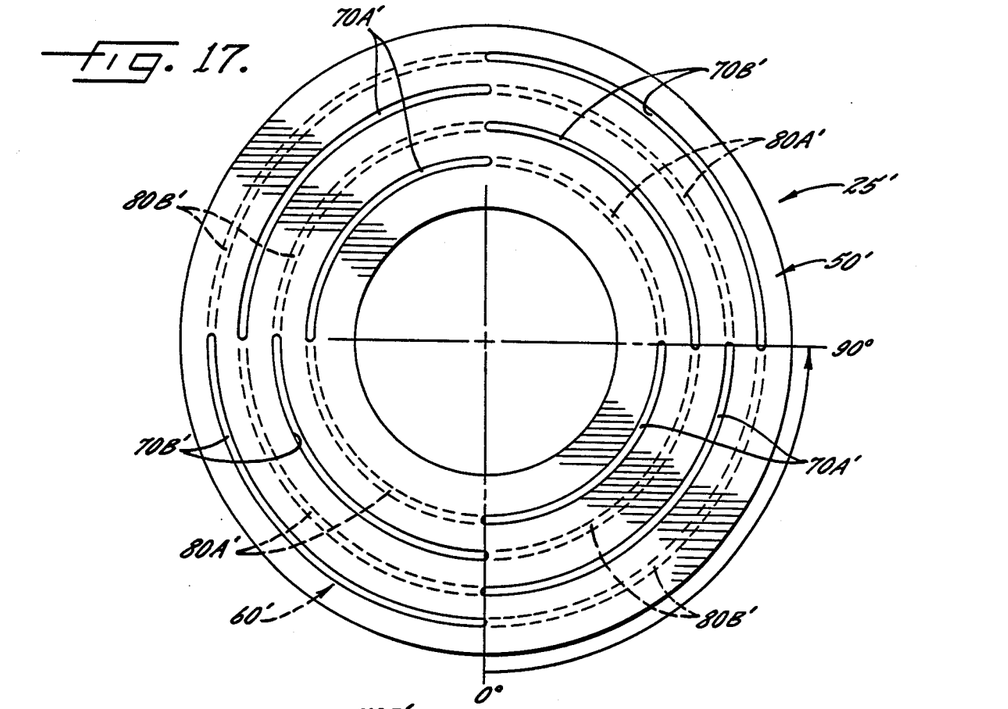

When the rotor 50' rotates through an additional 45 degrees relative to the armature 60' and to the position shown in FIG. 17, the slots 70A' of the rotor are located in the same quadrants as the slots 80B' of the armature but are radially offset from or mismatched with the slots 80B, along their entire lengths. In addition, the slots 70B' of the rotor are disposed in the same quadrants as the slots 80A' of the armature but are radially offset therefrom. Because of the high degree of radial mismatch of the slots 70A' and 70B' with the slots 80B' and 80A', respectively, maximum torque is transmitted from the rotor to the armature substantially in the same manner as described in connection with FIGS. 3 to 5 of the clutch 25 of the first embodiment.

Figure 18:
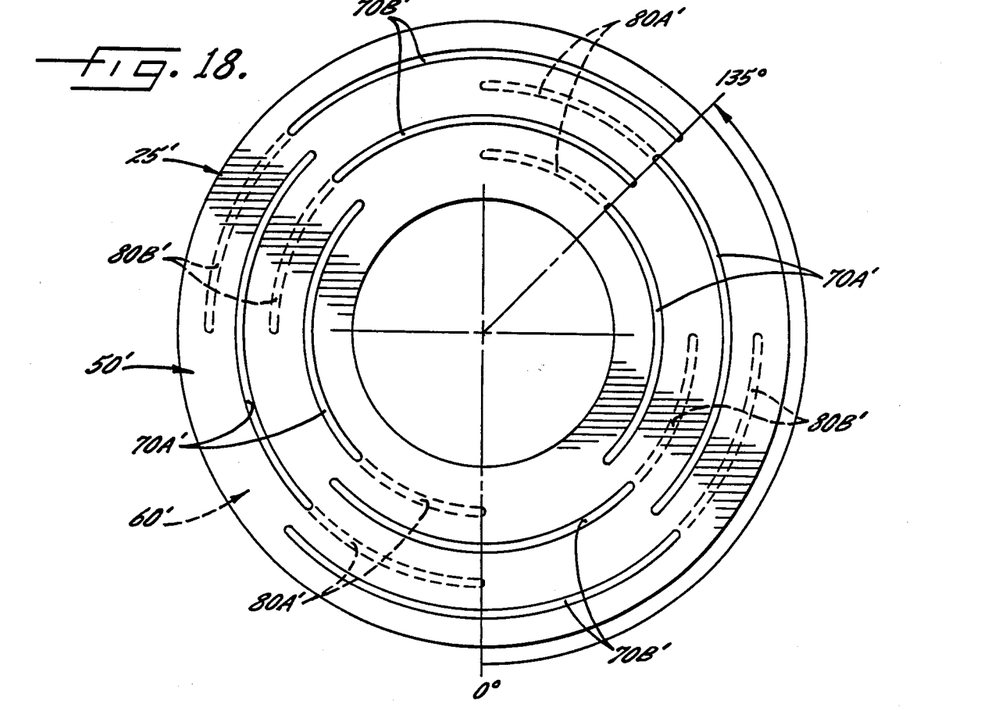

When the rotor disc 50' turns through still another 45 degrees relative to the armature disc 60' and to the position shown in FIG. 18, the slots 70A' and 70B' aline radially with the slots 80A' and 80B' in essentially the same manner as in FIG. 16 so as to cause partial torque to be transmitted.

Accordingly, the clutch 25' operates essentially the same as the clutch 25 except that the torque goes from a maximum value to virtually zero and then back to maximum in each 180 degrees of relative rotation rather than each 360 degrees. Also, the slots of the clutch 25' are arranged in quadrants and extend around true arcs so as to avoid the need of cutting spiral slots. Instead of extending through only 90 degrees, each of the slots 70A', 70B' and 80A' and 80B' could extend effectively through 180 degrees. In such an instance, the torque would go from maximum to zero and back to maximum upon each 360 degrees of relative rotation, the same as the clutch 25.

The clutches 25 and 25' of FIGS. 1 to 18 are particularly suitable for use in driving a so-called "inertia load". An inertia load has a flywheel effect so that, when torque is not actually being applied to the load, the energy stored in the load will cause the load to coast without a significant reduction in speed until torque once again is applied to the load. Thus, even though the torque applied to the load by the clutch 25 goes to zero for an instant during each revolution of slippage, the clutch is still capable of bringing the load up to speed.

Figures 19, 20, 21:
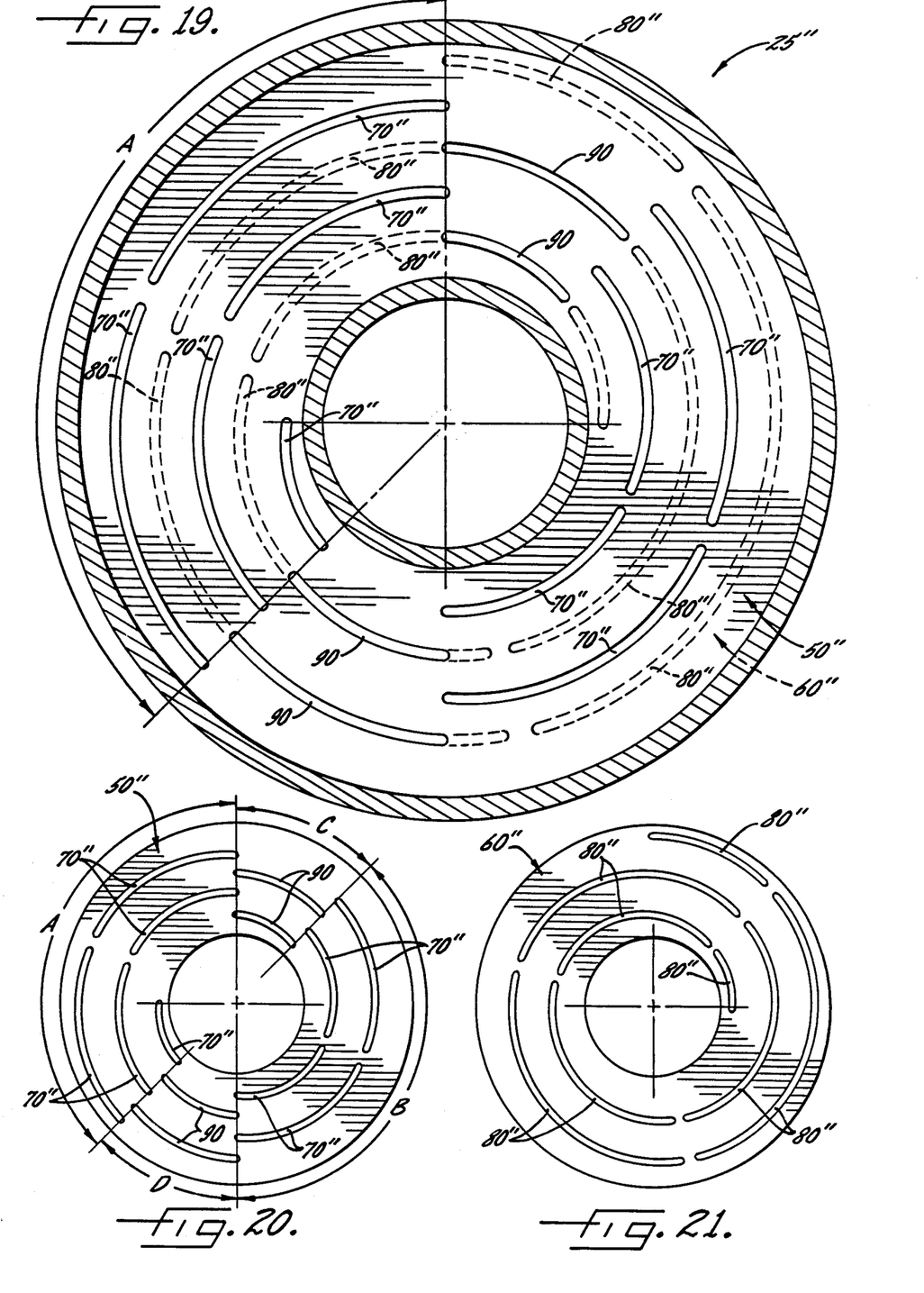

FIGS. 19 to 21 show the rotor disc 50" and the armature disc 60" of a clutch 25" which is particularly useful in driving a so-called "pump load". A pump load differs from an inertia load in that a pump load does not possess a significant flywheel effect and tends to lose significant speed if torque is not continuously applied to the load. With the clutches 25 and 25' where the torque goes to zero during each revolution or each one-half revolution of slippage, the time required to bring a pump load to full speed could be excessively high. The clutch 25" of FIGS. 19 to 21, however, is constructed such that the torque varies from a maximum value to some finite minimum value above zero during start-up. Accordingly, the clutch 25" is better able to bring a pump load up to speed than the clutches 25 and 25' but with some sacrifice in soft-starting since the average torque during start-up of the clutch 25" is higher than that of the clutches 25 and 25'.

More specifically, the armature disc 60" of the clutch 25" is exactly the same as the armature disc 60 of the clutch 25 as is apparent by comparing FIG. 21 with FIG. 5. Thus, the slots 80" in the armature disc 60" correspond identically in shape, number and location to the slots 80 of the armature disc 60. The rotor disc 50" of the clutch 25', however, has slots which are arranged differently from the slots of the rotor disc 50.

As shown in FIG. 20, the rotor disc 50" is formed with nine slots 70" which follow essentially the same spiral as the eight slots 70 of the rotor disc 50. The slots 70", however, are shorter in length than the slots 70, except for the innermost slot 70" which is substantially equal in length to the corresponding slot 70. Also, one group of slots 70" occupies in the disc an area which is bounded by angle A (herein, 135 degrees) while another group of the slots 70" occupies an equal and diametrially opposite area bounded by angle B. The slots 70" do not extend into those areas bounded by the smaller angles C and D. Located within the latter areas are a total of four slots 90 which do not extend into the areas bounded by the angles A and B. The slots 90 all lie on a common spiral which is concentric with but is offset inwardly from the spiral defined by the slots 70" by a distance equal to one-half the radial spacing between adjacent slots 70".

FIG. 19 shows the relative positions of the rotor slots 70" and 90 and the armature slots 80" when the rotor and armature discs 50" and 60" are located angularly relative to one another to produce maximum torque. Those same relative positions are shown in non-superimposed relation by FIGS. 20 and 21. As is apparent, there is a significant radial mismatch between the rotor slots 70" and the armature slots 80" when the two discs 50" and 60" are positioned as shown in FIG. 19 and thus substantial torque is transmitted. The rotor slots 90, however, are in radially matched relation with portions of the armature slots 80 and thus there is no flux transfer between those disc areas bounded by the angles C and D. Accordingly, the maximum torque capacity of the clutch 25" is less than the maximum torque capacity of the clutch 25.

When the rotor disc 50" is rotated from the position shown in FIGS. 19 and 20 and through 180 degrees relative to the armature disc 60", the rotor slots 70" move into radially matched relationship with the armature slots 80" and thus the torque which is transmitted by the clutch decreases. At this time, however, the rotor slots 90 are in radially mismatched relation with the armature slots 80". As a result, the clutch 25" continues to transmit torque of some finite minimum value and the torque never goes to zero. This enables the clutch 25" to bring a pump load up to speed in an acceptable period of time but, when compared with the clutch 25, the clutch 25" does not engage as gradually and is not capable of transmitting such high torque once full engagement has taken place.

Many loads are either "pump" loads or are a combination of a "pump" load and an "inertia" load and thus will require a clutch similar to the clutch 25" which always maintains some minimum level of torque. By increasing the angles A and B, the maximum torque may be increased and the minimum torque may be decreased. Conversely, by increasing the angles C and D, the maximum torque may be decreased and the minimum torque may be increased. Accordingly, the clutch may be tailored for different loads by appropriately locating the slots.

It should be realized that the slots 70A' and 70B' of the rotor disc 50' of FIGS. 15 to 18 also can be modified so as to enable the clutch 25' to drive a pump load. This may be achieved simply by arranging the slots 70A' to extend through more than 90 degrees and arranging the slots 70B' to extend through less than 90 degrees or vice versa. Alternatively, the slots 70A' and 70B' may be arranged on different radii than the slots 80A' and 80B', respectively, of the armature 60'.

From the foregoing, it will be apparent that the present invention brings to the art a new and improved electromagnetic coupling in which the radial relationship between the high reluctance regions of the opposing disc-like members changes as the relative angular position of the members change. As a result, the coupling is capable of engaging gradually and with a soft start and then building up to full torque without need of an electronic control for varying the magnitude of the current flowing through the winding of the coupling.

I claim:

1. An electromagnetic coupling comprising first and second discs disposed in face-to-face relation and made of low reluctance magnetic material, said first disc being rotatable relative to said second disc about a predetermined axis, each disc having regions of high magnetic reluctance, said regions being located and shaped such that the high reluctance regions of said first disc are more nearly radially alined with the high reluctance regions of said second disc when said first disc is in a first angular position relative to said second disc than when said first disc is in a second angular position relative to said second disc.

2. An electromagnetic coupling as defined in claim 1 in which said high reluctance regions are located and shaped such that the high reluctance regions of said first disc are least nearly radially alined with the high reluctance regions of said second disc when said first disc is in a predetermined angular position relative to said second disc and are most nearly radially alined with the high reluctance regions of said second disc when said first disc turns from said predetermined position and through approximately 180 degrees relative to said second disc.

3. An electromagnetic coupling as defined in claim 1 in which said high reluctance regions are located and shaped such that the high reluctance regions of said first disc are least nearly radially alined with the high reluctance regions of said second disc when said first disc is in a predetermined angular position relative to said second disc and are most nearly radially alined with the high reluctance regions of said second disc when said first disc turns from said predetermined position and through approximately 90 degrees relative to said second disc.

4. An electromagnetic coupling as defined in claim 1 in which the high reluctance regions of each disc spiral around said axis.

5. An electromagnetic coupling as defined in claim 2 in which the high reluctance regions of each disc are defined by a series of angularly spaced slots arranged in a multiple turn spiral having a center located on said axis.

6. An electromagnetic coupling as defined in claim 4 in which the high reluctance regions of one of said discs are arranged around concentric spirals having centers located on said axis.

7. An electromagnetic coupling as defined in claim 1 in which each disc includes first and second diametrically spaced groups of radially spaced high reluctance regions each extending circumferentially through a first predetermined angle, each disc further including third and fourth diametrically spaced groups of radially spaced high reluctance regions each located circumferentially between said first and second groups and extending circumferentially through a second predetermined angle, the high reluctance regions of said first and second groups being offset radially from the high reluctance regions of said third and fourth groups.

8. An electromagnetic coupling as defined in claim 7 in which said first and second predetermined angles are equal.

9. An electromagnetic coupling comprising first and second discs disposed in face-to-face relation and made of low reluctance magnetic material, said first disc being rotatable relative to said second disc about a predetermined axis, each disc having at least one region of high magnetic reluctance extending generally circumferentially of the disc, said regions being shaped and located such that the radial relation between the high reluctance region of the first disc and the high reluctance region of the second disc is different when said first disc in different angular positions relative to said second disc.

10. An electromagnetic coupling as defined in claim 9 in which each high reluctance region spirals around said axis.

11. An electromagnetic coupling as defined in claim 10 in which each high reluctance region defines a multiple turn spiral.

12. An electromagnetic coupling as defined in claim 11 in which each turn of said spiral is interrupted by angularly spaced low reluctance regions, the low reluctance regions of said turns being in angular alinement.

13. An electromagnetic coupling as defined in claim 9 in which each high reluctance region is defined by slot means formed through the respective disc and extending spirally around said axis.

14. An electromagnetic coupling as defined in claim 13 in which said slot means define a multiple turn spiral interrupted by angularly spaced regions of low magnetic reluctance.

15. An electromagnetic coupling as defined in claim 13 in which the low reluctance regions of each turn of said spiral are in angular alinement with the low reluctance regions of each adjacent turn.

16. An electromagnetic coupling as defined in claim 9 in which each disc includes a first high reluctance region extending through a first predetermined angle and further includes a second high reluctance region spaced radially and circumferentially from the first high reluctance region and extending through a second predetermined angle.

17. An electromagnetic coupling as defined in claim 16 in which each disc includes a third high reluctance region spaced diametrically from and alined radially with said first high reluctance region, and further includes a fourth high reluctance region spaced diametrically from and alined radially with said second high reluctance region.

18. An electromagnetic coupling as defined in claim 17 in which the first and third high reluctance regions of each disc respectively occupy first and third diametrically spaced quadrants of the disc, the second and fourth high reluctance regions of each disc respectively occupying second and fourth diametrically spaced quadrants of the disc.

19. An electromagnetic clutch comprising driving and driven members made of low reluctance magnetic material and supported in face-to-face relation to rotate about a predetermined axis, said driving member normally being spaced axially from and being rotatable relative to said driven member, means operable when energized by a voltage source to create magnetic flux which threads across the space between said members to attract said members axially into engagement and to cause said driving member to rotate said driven member, said clutch being characterized in that each member is formed with regions of high magnetic reluctance, said regions being located such that the radial alinement between the high reluctance regions of said driving member and the high reluctance regions of said driven member varies when said members are in different angular positions relative to one another, said driving member transmitting more torque to said driven member when said high reluctance regions are less nearly in radial alinement than when said high reluctance regions are more nearly in radial alinement.

20. An electromagnetic clutch as defined in claim 19 in which the high reluctance regions of each member spiral around said axis, the high reluctance regions of said driving member being in precise radial alinement with the high reluctance regions of said driven member when said driving member is in a predetermined angular position relative to said driven member.

21. An electromagnetic clutch as defined in claim 19 in which the high reluctance regions of said driving member and the high reluctance regions of said driven member are identical in size, shape and location.

22. An electromagnetic clutch as defined in claim 19 in which said high reluctance regions are located such that the high reluctance regions of said driving member are least nearly radially alined with the high reluctance regions of said driven member when said driving member is in a predetermined angular position relative to said driven member and are most nearly radially alined with the high reluctance regions of said driven member when said driving member turns from said predetermined position and through 90 degrees relative to said driven member.

23. An electromagnetic clutch as defined in claim 19 in which the high reluctance regions of each member spiral around said axis, the high reluctance regions of one member coinciding with portions of a single multiple turn spiral having a center located on said axis, the high reluctance regions of the other member coinciding with portions of a plurality of concentric multiple turn spirals having centers located on said axis.

* * * * *